US012202222B1

(12) United States Patent
Liu et al.

(10) Patent No.: US 12,202,222 B1
(45) Date of Patent: Jan. 21, 2025

(54) CONTROLLABLE RAPID PRESSURE LOADING TECHNOLOGY FOR LARGE VOLUME PRESS

(71) Applicant: Jilin University, Changchun (CN)

(72) Inventors: Zhaodong Liu, Changchun (CN); Kuo Hu, Changchun (CN); Ran Liu, Changchun (CN); Shucheng Liu, Changchun (CN); Di Yao, Changchun (CN); Xiaoming Zhang, Changchun (CN); Qiang Zhou, Changchun (CN); Bingbing Liu, Changchun (CN)

(73) Assignee: Jilin University, Changchun (CN)

( * ) Notice: Subject to any disclaimer, the term of this patent is extended or adjusted under 35 U.S.C. 154(b) by 0 days.

(21) Appl. No.: 18/797,808

(22) Filed: Aug. 8, 2024

(30) Foreign Application Priority Data

Nov. 15, 2023 (CN) ........................ 202311514706.5

(51) Int. Cl.
*B30B 11/00* (2006.01)

(52) U.S. Cl.
CPC .................................. *B30B 11/004* (2013.01)

(58) Field of Classification Search
CPC ...... B01J 3/00; B01J 3/06; B01J 3/067; B30B 11/004
See application file for complete search history.

(56) References Cited

U.S. PATENT DOCUMENTS

| | | | | |
|---|---|---|---|---|
| 3,517,413 A * | 6/1970 | Takahashi | B01J 3/067 425/77 |
| 3,947,541 A * | 3/1976 | Barnes | B30B 11/007 425/DIG. 26 |
| 2003/0057786 A1* | 3/2003 | Tado | B01J 3/067 310/166 |

FOREIGN PATENT DOCUMENTS

| | | |
|---|---|---|
| CN | 117227240 | 12/2023 |

OTHER PUBLICATIONS

Notification of Grant Patent Right for Invention for Chinese Patent Application No. 202311514706.5, issued Dec. 19, 2023, 2 pages.

* cited by examiner

*Primary Examiner* — Thu Khanh T. Nguyen
(74) *Attorney, Agent, or Firm* — DLA PIPER LLP (US)

(57) ABSTRACT

A controllable rapid pressure loading technology for a large volume press is provided. A regular octahedra, plugs, diamond pistons, and a standard are included. The regular octahedra is provided with a cavity with openings at two ends of the cavity. The standard is placed in the cavity. The openings at two ends of the cavity are respectively blocked by the conductive plugs. The diamond piston is arranged between the standard and the plug. The diamond pistons arranged between the standard and the plug has high hardness and has the pressure transmission efficiency superior to that of a common ceramic plug, improving compression efficiency in sample cavity. A loading method of pre-charging a pressure to a pressure loading device first and then rapidly releasing to a pressure loading mold is used to match an improved pressure transmission component, which shortens the pressure loading time of the sample cavity.

9 Claims, 10 Drawing Sheets

CONTROLLABLE RAPID PRESSURE LOADING TECHNOLOGY FOR LARGE VOLUME PRESS

CROSS-REFERENCE TO RELATED APPLICATION

This patent application claims the benefit and priority of Chinese Patent Application No. 202311514706.5 filed with the China National Intellectual Property Administration on Nov. 15, 2023, the disclosure of which is incorporated by reference herein in its entirety as part of the present application.

TECHNICAL FIELD

The present disclosure relates to the technical field of high pressure experiments, and in particular, to a controllable rapid pressure loading technology for a large volume press.

BACKGROUND

Rapid pressure loading in millisecond levels relates to various fields such as condensed matter physics, materials science, and mechanics and plays an important role especially in researches on amorphous materials. In recent years, people have found that amorphous materials can exhibit improved characteristics such as toughness and optics and have potential application prospects in fields such as high-end equipment materials, aerospace materials, and photoelectricity. However, current commercial presses mainly adopt static high pressure, and pressure loading time thereof generally ranges from seconds to hours. Designing a pressure transmission device to effectively achieve rapid loading in the millisecond level of a press is an urgent technical problem to be solved by those skilled in the art.

SUMMARY

An objective of the present disclosure is to provide a controllable rapid pressure loading technology for a large volume press for solving defects and deficiencies in various technologies. In the controllable rapid pressure loading technology for the large volume press, a diamond piston is arranged between a standard and a plug, which improves the compression efficiency of a sample cavity, thereby realizing a faster rapid pressure loading.

To achieve the above objective, a technical solution adopted by the present disclosure is provided by the following.

The present disclosure provides a pressure transmission component, including a regular octahedra, plugs, diamond pistons, and a standard. The regular octahedra is provided with a cavity with openings at two ends of the cavity; the standard is placed in the cavity; the openings at the two ends of the cavity are respectively blocked by the plugs with an electrically conductive function; and each of the diamond pistons is arranged between the standard and a corresponding one of the plugs.

Preferably, each of the diamond pistons has a first surface that is in contact with the standard; the standard has second surfaces that are in contact with the diamond pistons respectively; and the first surface is not smaller than each of the second surfaces.

Preferably, the standard is externally sleeved with a first protective sleeve; and the first protective sleeve is able to cover the standard in a height direction over an overall height of the standard.

Preferably, the plugs are externally sleeved with second protective sleeves respectively; and each of the second protective sleeves is able to cover a corresponding one of the plugs in a height direction over an overall height of the corresponding one of the plugs.

Preferably, the first protective sleeve, the first protective sleeve, the second protective sleeves, and the regular octahedra are all made of materials with a compressive strength not greater than 600 MPa.

Preferably, the plugs are made of molybdenum.

The present disclosure further provides a pressure loading mold, including secondary anvils and the pressure transmission component. A structure formed by stacking the secondary anvils is internally provided with a first placement cavity; a shape of the first placement cavity is adapted to a shape of the pressure transmission component; and the pressure transmission component is placed in the first placement cavity.

Preferably, the secondary anvils are externally provided with primary anvils; a structure formed by stacking the primary anvils is internally provided with a second placement cavity; a shape of the second placement cavity is adapted to a shape of a structure formed by stacking all the secondary anvils; and the secondary anvils are placed in the second placement cavity.

Preferably, the primary anvils are externally provided with a housing; the housing is internally formed with a third placement cavity; a shape of the third placement cavity is adapted to a shape of a structure formed by stacking all the primary anvils; the primary anvils are placed in the third placement cavity; and end covers for closing the third placement cavity are respectively arranged at two ends of the housing.

The present disclosure further provides a pressure loading method, implemented by using the pressure loading mold, and includes:

step 1: applying a pre-pressure to the pressure loading mold to compress various components of the pressure loading mold, and recording a current initial pressure value A GPa in a sample cavity;

step 2: obtaining a correspondence relationship between an oil pressure and a pressure in the sample cavity in a manner of calibrating a phase transition of the standard by means of an indirect pressure loading method with a static high pressure, obtaining a pressure correction curve by fitting according to a phase transition point of the standard, and pre-charging a pressure in a pressure loading device according to the pressure correction curve, so that the pressure in the pressure loading device is not lower than an external oil pressure corresponding to a pressure in the sample cavity of (A+10) GPa; and step 3: controlling the pressure loading device to release a pressure to the pressure loading mold, wherein a pressure release time is (20+/−3) ms, and a pressure in the sample cavity reaches (A+10) GPa.

Compared with the conventional technology, the present disclosure can achieve the following technical effects:

1. The diamond piston is arranged between the standard and the plug, the pressure transmission component of the present disclosure can achieve pressure loading in millisecond level by using the characteristic of high hardness of the diamond piston.

Other technical solutions of the present disclosure can also achieve the following technical effects:

2. According to the present disclosure, the corresponding relationship between the oil pressure and the pressure in the sample cavity is obtained in a manner of calibrating the phase change of the standard by the indirect static high pressure loading method first, the pressure correction curve is obtained by fitting according to the phase change point of the standard, and a pressure is pre-charged according to the pressure correction curve, so that the pressure in a pressure loading device is not lower than the external oil pressure corresponding to (A+10) GPa; and the pressure loading device is controlled to release a pressure to the pressure loading mold, and the pressurizing manner of controlling the pressure release time to be (20+/−3) ms matches an improved transmission component and a loading mold, which achieves that the maximum pressure of the sample cavity is greater than 10 GPa within the pressure recording time in millisecond level, overcomes a defect that the maximum pressure of the sample cavity is not greater than 10 GPa within the pressure loading time at the millisecond level in the conventional technology, and promotes further development of high pressure experimental science.

BRIEF DESCRIPTION OF THE DRAWINGS

To describe technical solutions in embodiments of the present disclosure or in the prior art more clearly, the following briefly describes the accompanying drawings required for describing the embodiments or the prior art technology. Apparently, the accompanying drawings in the following description are merely some embodiments of the present disclosure, and those of ordinary skill in the art may also obtain other drawings from these accompanying drawings without creative efforts.

Figure 1:
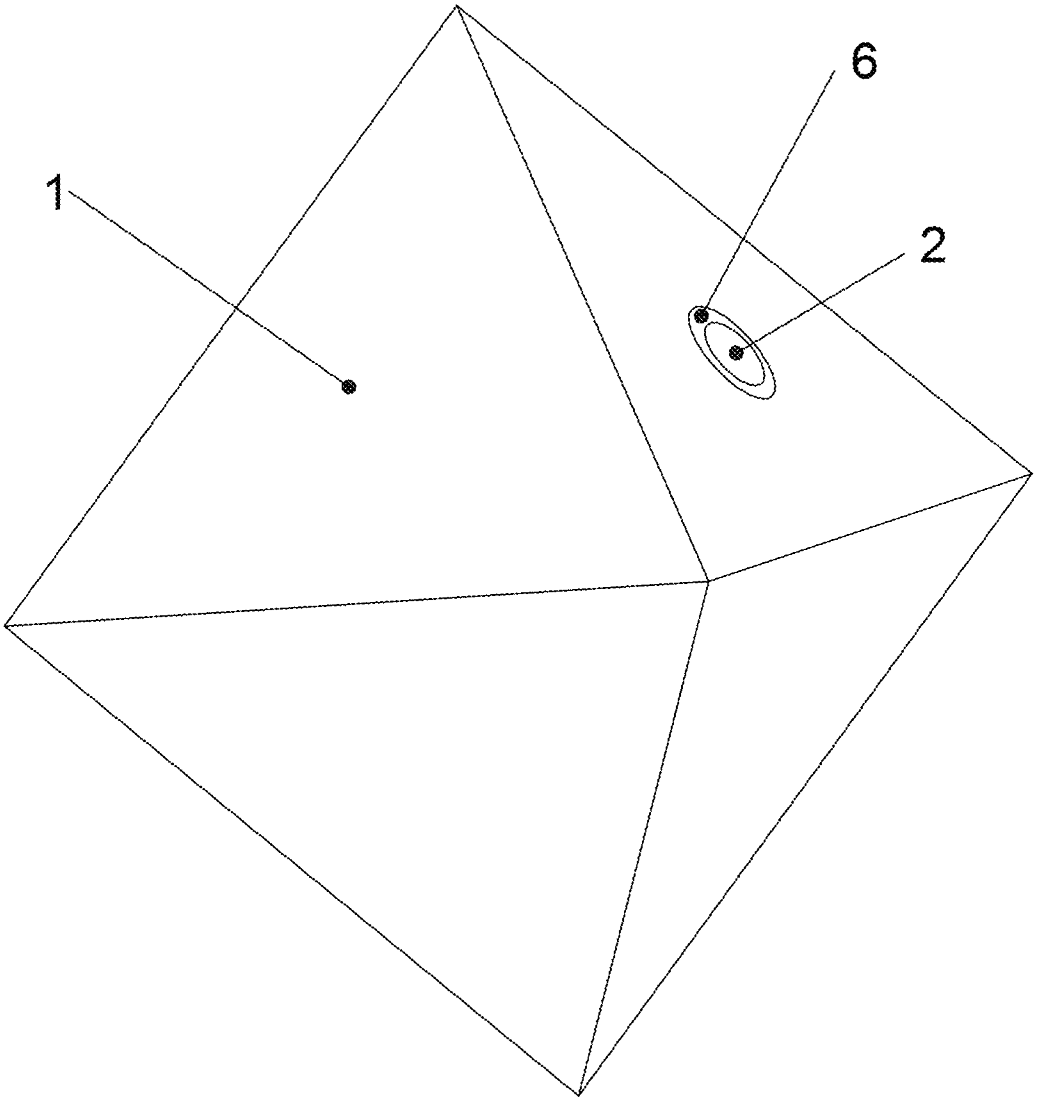
FIG. 1 is a schematic diagram of an overall structure of a pressure transmission component.

Reference numerals in the drawings: 1 regular octahedra; 2 plug; 3 diamond piston; 4 standard; 5 first protective sleeve; 6 second protective sleeve; 7 secondary anvil; 8 primary anvil; 9 housing; and 10 end cover.

DETAILED DESCRIPTION OF THE EMBODIMENTS

Technical solutions in embodiments of the present disclosure will be clearly and completely described herein below with reference to accompanying drawings in the embodiments of the present disclosure. Apparently, the described embodiments are merely part rather than all embodiments of the present disclosure. On the basis of the embodiments of the present disclosure, all other embodiments obtained by those of ordinary skill in the art without creative effect fall within the scope of protection of the present disclosure.

To make the above objective, features, and advantages of the present disclosure more apparent and more comprehensible, the disclosed embodiments are further described in detail below with reference to the accompanying drawings and specific implementations.

Figure 2:
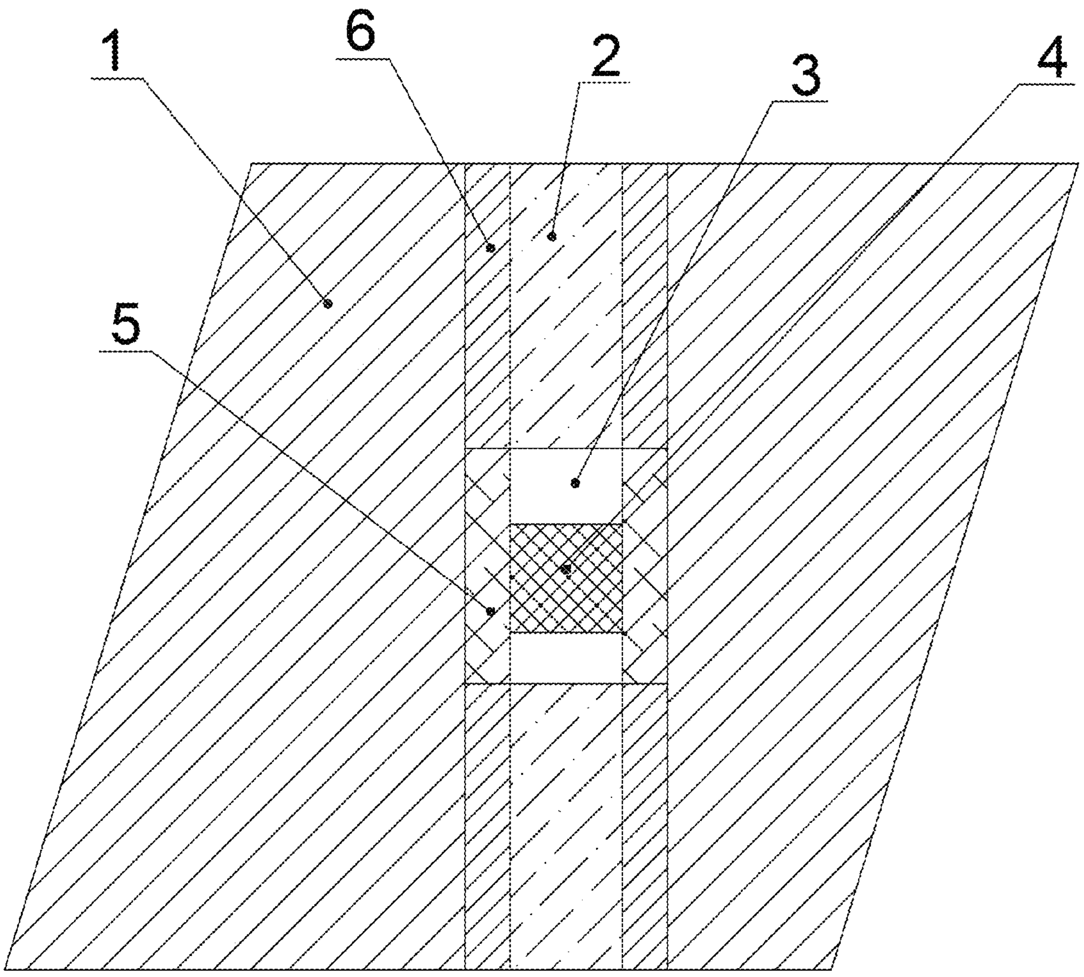
FIG. 2 is a structural sectional view of the pressure transmission component.
Figure 3:
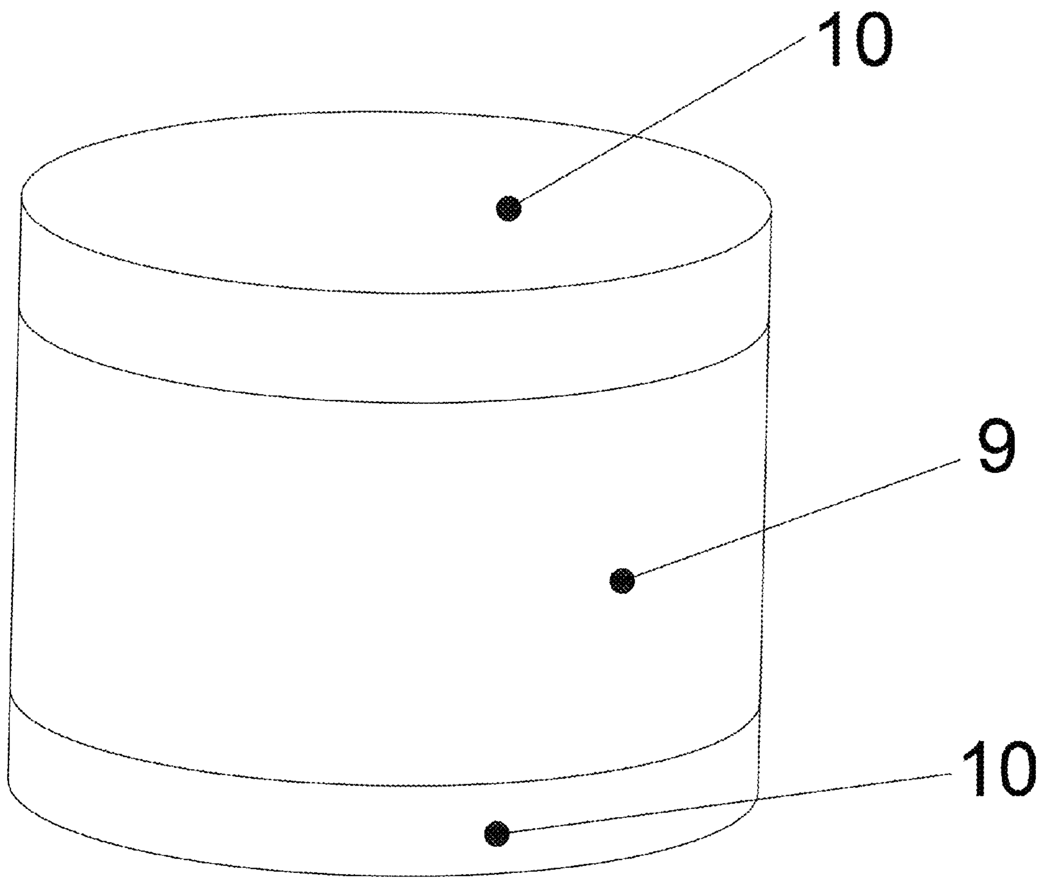
FIG. 3 is a schematic diagram of an overall structure of a pressure loading mold.
Figure 4:
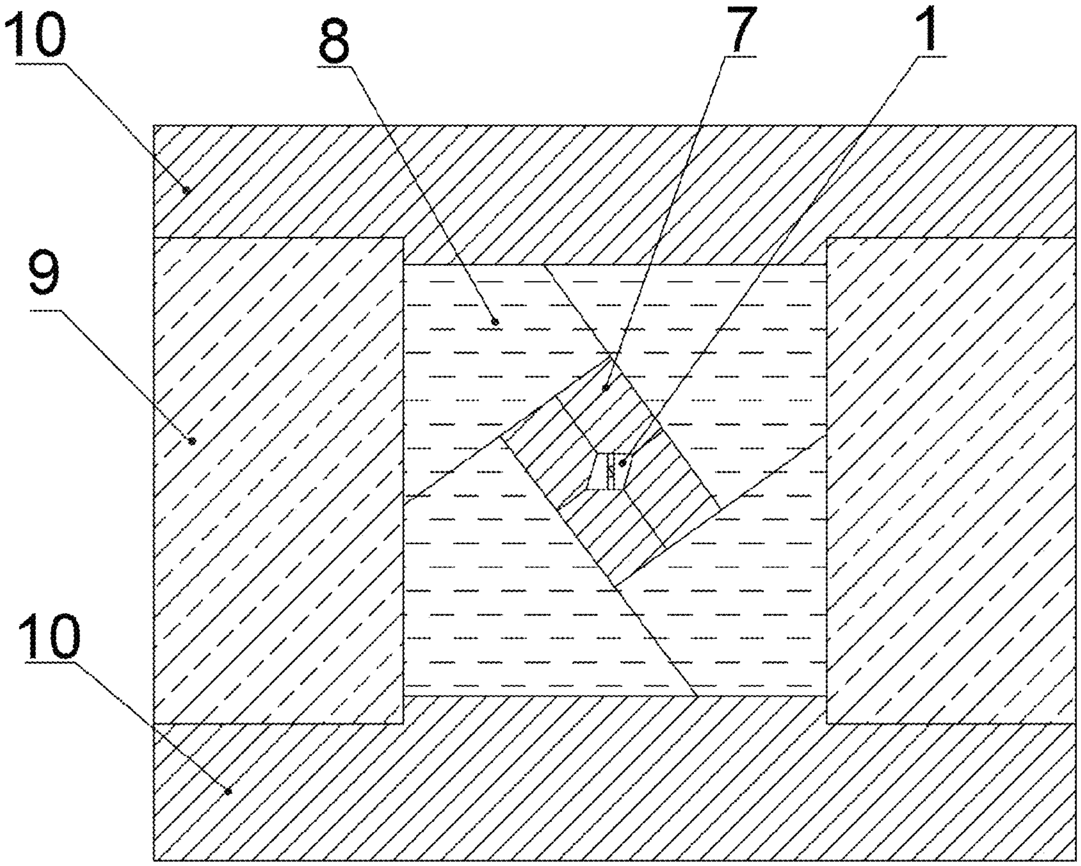
FIG. 4 is a structural sectional view of the pressure loading mold.
Figure 5:
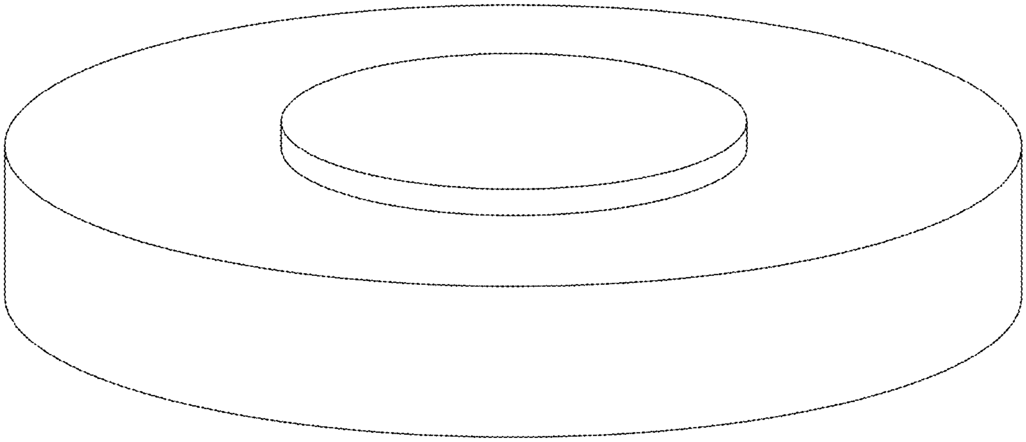
FIG. 5 is a structural schematic diagram of an end cover.
Figure 6:
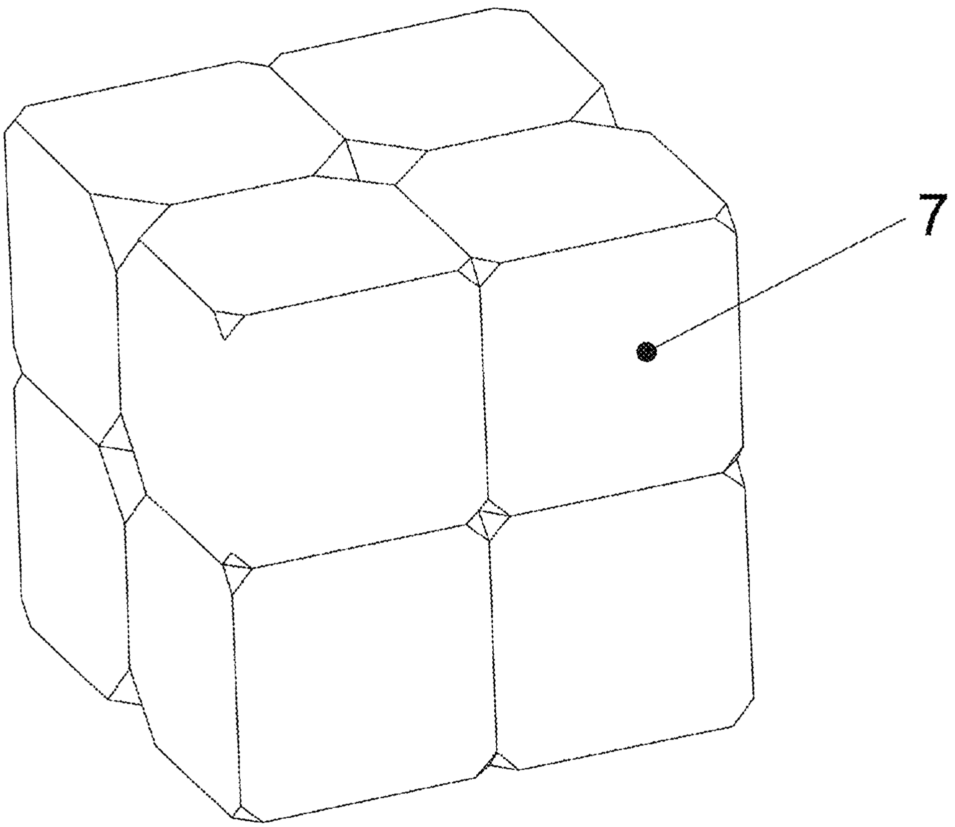
FIG. 6 is a schematic diagram of an external structure of a structure formed by stacking secondary anvils.
Figure 7:
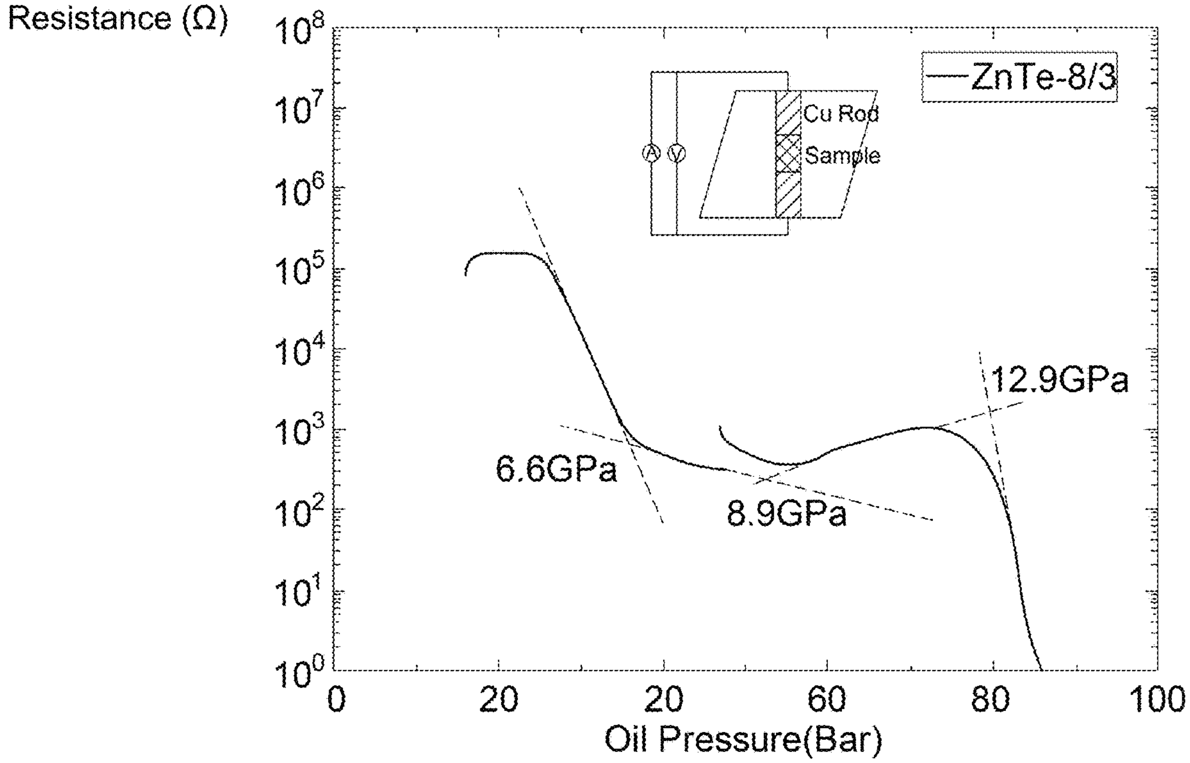
FIG. 7 and FIG. 8 are plots showing relationship between an oil pressure and electrical resistance measured by a static high pressure experiment.
Figure 8:
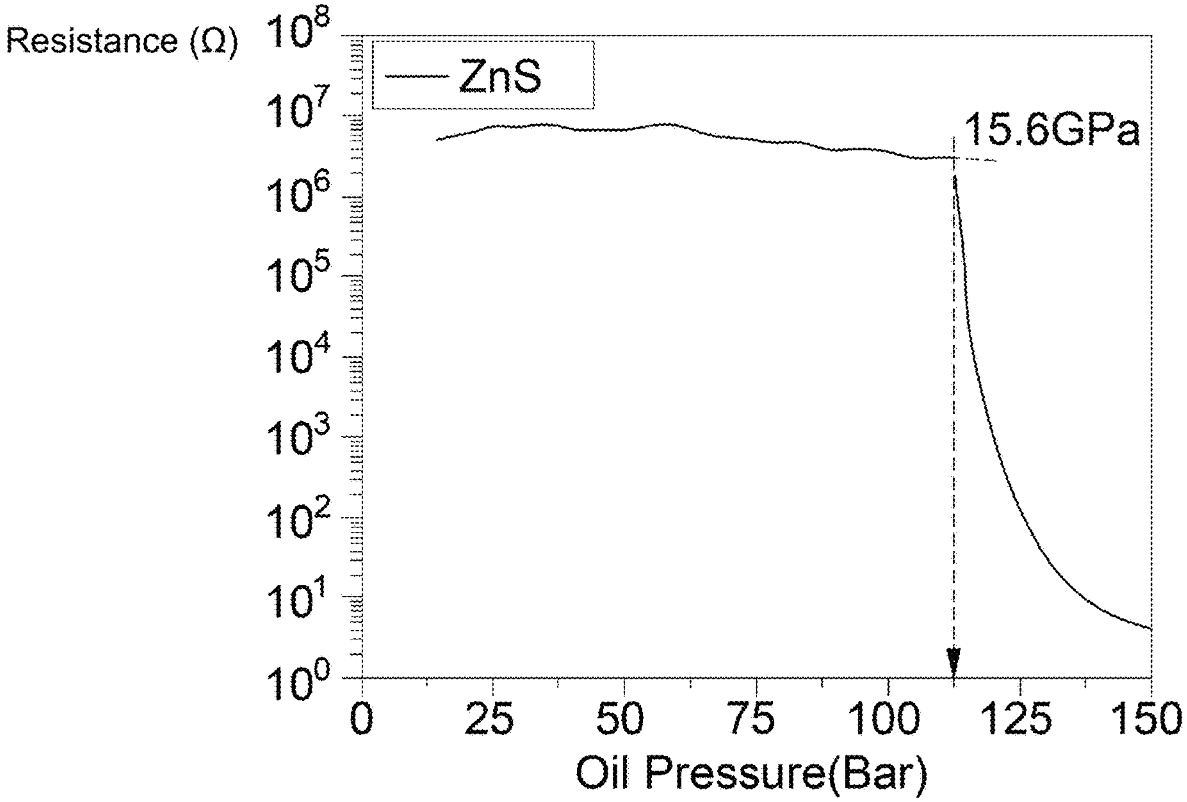
Figure 9:
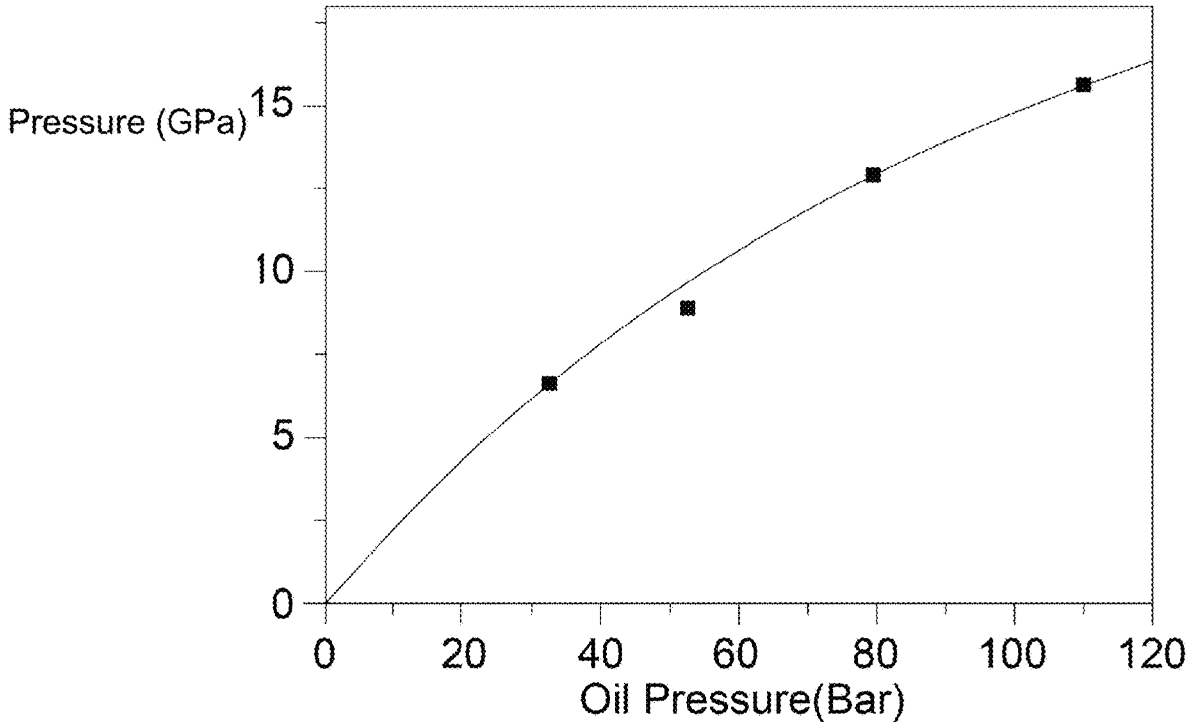
FIG. 9 is a plot showing relationship between an oil pressure and a pressure in a sample cavity, wherein the plot is obtained by fitting according to the relationship between the oil pressure and the electrical resistance measured by the high pressure experiment.
Figure 10:
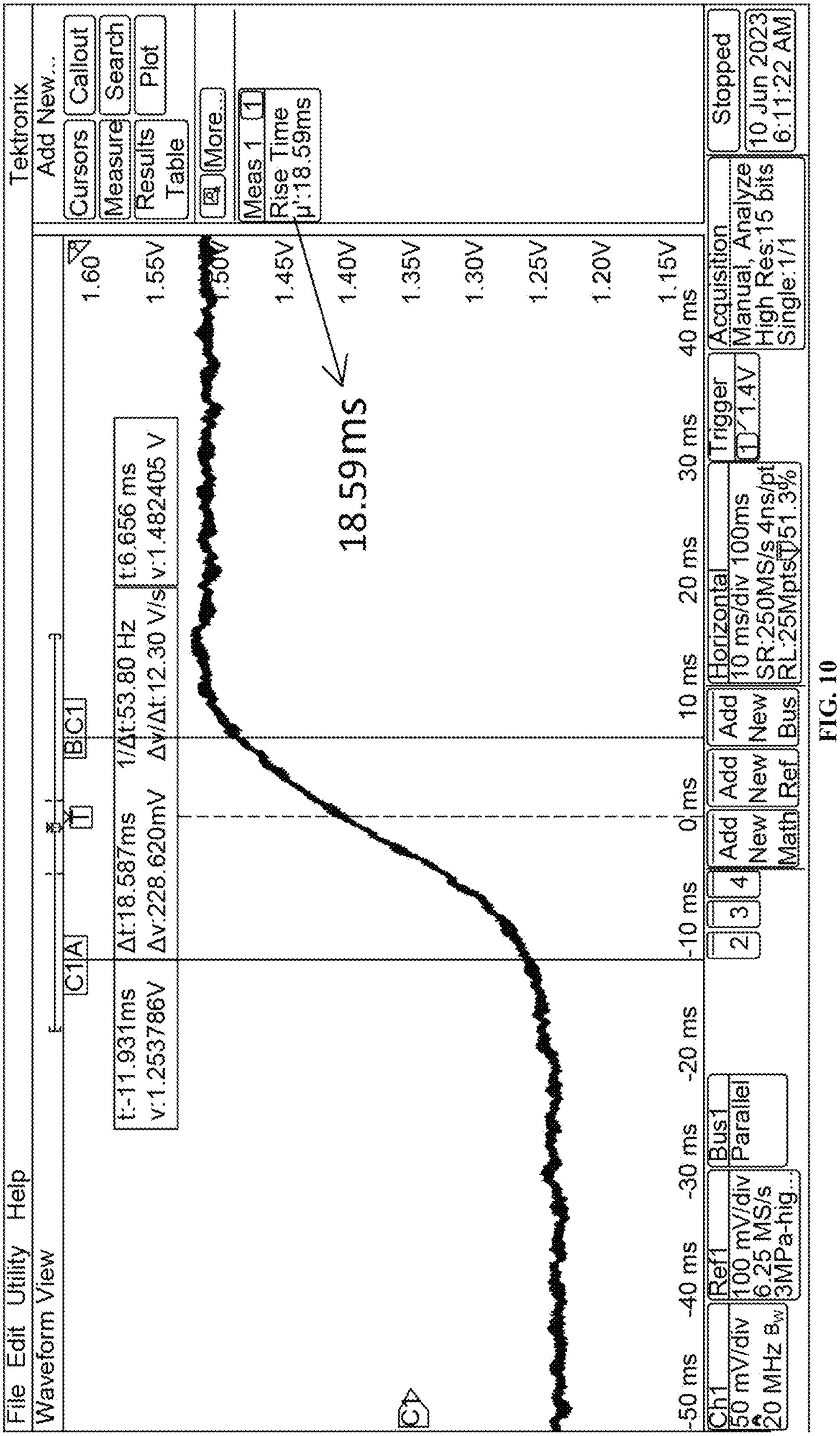
FIG. 10 is a time diagram displayed by an oscilloscope in a rapid compression experiment.
Figure 11:
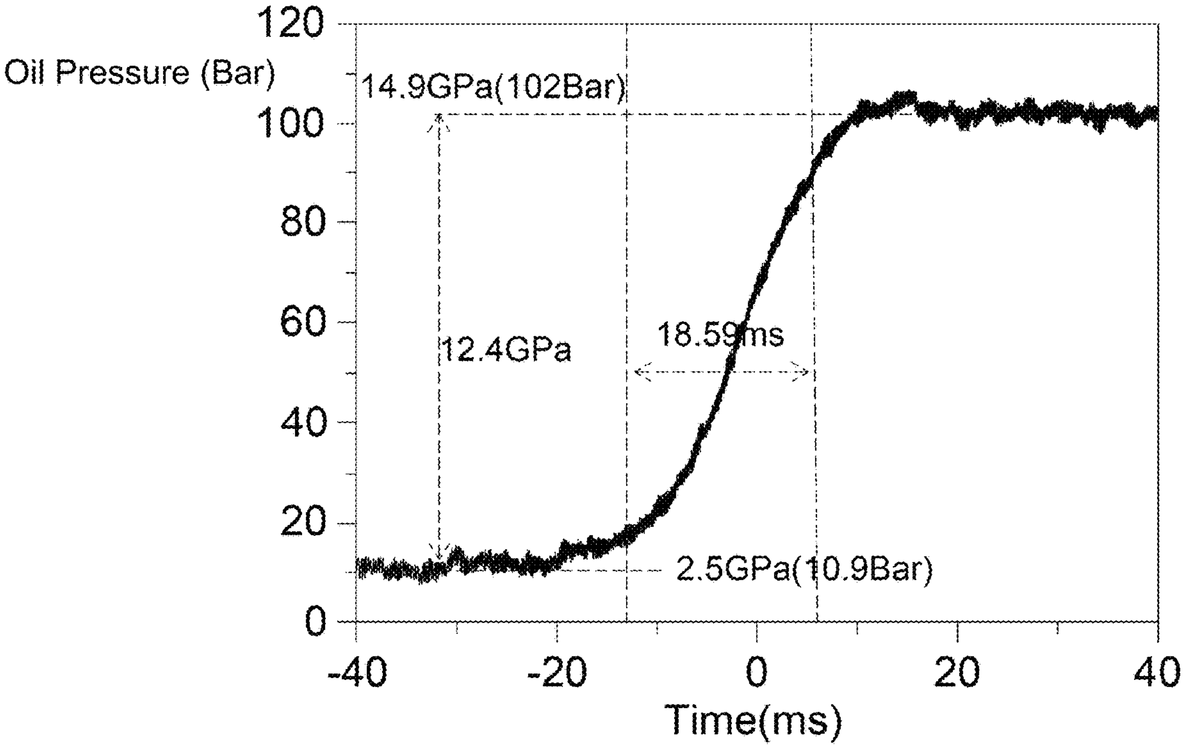
FIG. 11 is a plot showing a relationship between the pressure in the sample cavity and loading time in the rapid compression machine.

As shown in FIG. 1 to FIG. 2, the present disclosure discloses a pressure transmission component, a pressure loading mold, and a pressure loading method, which may also be referred to as a controllable rapid pressure loading technology for a large volume press. The pressure transmission component includes a regular octahedra 1, plugs 2, diamond pistons 3, and a standard 4. The regular octahedra 1 is provided with a cavity with openings at two ends of the cavity. The standard 4 is placed in the cavity. The openings at the two ends of the cavity are blocked by the conductive plugs 2. The diamond piston 3 is arranged between the standard 4 and the plug 2. Compared with an arrangement manner that the standard 4 is in direct contact with the plugs 2, the arrangement manner of the present disclosure that the standard 4 is in indirect contact with the plugs 2 improves the compression efficiency of a sample cavity.

The diamond piston 3 has a first surface that is in contact with the standard 4. The standard 4 has a second surface that is in contact with the diamond piston 3. To make the standard 4 be pressed uniformly, the first surface is set not to be smaller than the second surface in the present disclosure. To avoid sample flowing and improve a binding effect on the standard 4, the standard 4 is externally sleeved with a first protective sleeve 5. The first protective sleeve 5 is able to cover the standard 4 in a height direction over at least an overall height of the standard. Similarly, the plug 2 is externally sleeved with a second protective sleeve 6. The second protective sleeve 6 is also able to cover the plug 2 in a height direction over an overall height of the plug. In a case that a machining process is feasible, the first protective sleeve 5 and the second protective sleeves 6 may also be made into an integrated structure. As a preferred embodiment of the present disclosure, the first protective sleeve 5 and the second protective sleeve 6 are of split structures, so as to facilitate machining. The first protective sleeve 5, the second protective sleeves 6, and the regular octahedra 1 are all made of materials with a compressive strength not greater than 600 MPa. As a preferred embodiment of the present disclosure, the first protective sleeve 5, the second protective sleeves 6, and the regular octahedra 1 may be made of magnesium oxide or zirconium oxide. Other materials with the compressive strength not greater than 600 MPa also belong to a scope of protection of the present disclosure, and examples are not given for this one by one. The plugs 2 are made of a material that is conductive and has a compressive strength of about 1530 MPa. As a preferred embodiment of the present disclosure, the plugs 2 are made of molybdenum. Other metal materials that can meet the above requirements also belong to the scope of protection of the present disclosure.

As shown in FIG. 3 to FIG. 6, the pressure loading mold provided by the present disclosure includes secondary anvils 7 and a pressure transmission component. A structure formed by stacking the secondary anvils 7 is internally provided with a first placement cavity. A shape of the first placement cavity is adapted to a shape of the pressure transmission component. The pressure transmission component is placed in the first placement cavity. The structure formed by stacking the secondary anvils 7 may be formed by stacking two secondary anvils 7 at the top and the bottom, and may also be formed by stacking two, six, or eight secondary anvils 7. As a preferred embodiment of the present disclosure, the structure formed by stacking the secondary anvils 7 may be formed by stacking eight secondary anvils 7. At least edges, configured for forming the first placement cavity, of the secondary anvils 7 are chamfered to form the polyhedron-shaped first placement cavity. To improve the pressure transmission effect, all edges of the secondary anvils 7 are chamfered. As a preferred embodiment of the present disclosure, the pressure transmission component is of a regular octahedron shape.

The secondary anvils 7 are externally provided with primary anvils 8. A structure formed by stacking the primary anvils 8 is internally provided with a second placement cavity. A shape of the second placement cavity is adapted to a shape of a structure formed by stacking all secondary anvils 7. The secondary anvils 7 are placed in the second placement cavity. The structure formed by stacking the primary anvils 8 may be formed by stacking two, six, or eight primary anvils 8. As a preferred embodiment of the present disclosure, the structure formed by stacking the primary anvils 8 may be formed by stacking six primary anvils 8. As a preferred embodiment of the present disclosure, the structure formed by stacking all secondary anvils 7 is of a hexahedron shape.

The primary anvils 8 are externally provided with a housing 9. The housing 9 is internally formed with a third placement cavity. A shape of the third placement cavity is adapted to a shape of the structure formed by stacking all primary anvils 8. The primary anvils 8 are placed in the third placement cavity. End covers 10 for closing the third placement cavity are respectively arranged at two ends of the housing 9. To improve the binding effect of the housing 9 on the primary anvils 8, the housing 9 of the present disclosure is preferably of an integrated structure. As a preferred embodiment of the present disclosure, the structure formed by stacking all primary anvils 8 is of a cylindrical shape.

A pressure loading method provided by the present disclosure, implemented by using the pressure loading mold, and includes the following steps 1-3:

In step 1: a pre-pressure is applied to a pressure loading mold to compress various components of the pressure loading mold, and a current initial pressure value A GPa in a sample cavity is recorded.

In step 2: a correspondence relationship between an oil pressure and a pressure in the sample cavity is obtained in a manner of calibrating a phase transition of a standard by means of an indirect pressure loading method with high pressure, a pressure correction curve is obtained by fitting according to a phase transition point of the standard, and a pressure in a pressure loading device is pre-charged according to the pressure correction curve, so that the pressure in the pressure loading device is not lower than an external oil pressure corresponding to the pressure in the sample cavity of (A+10) GPa.

In step 3: the pressure loading device is controlled to release a pressure to the pressure loading mold, where the pressure release time is (20+/−3) ms, and the pressure in the sample cavity reaches (A+10) GPa.

In step 1, the pre-pressure is applied to the pressure loading mold, so that various components in the pressure loading mold are compressed to reduce gaps between the various components, thus preventing positions of the various components from being too scattered, the too scattered positions of the various components affect a pressure transmission speed of transmitting a pressure to the standard 4. A value of the pre-pressing force may be selected as required. As a preferred embodiment of the present disclosure, the pre-pressing force is 10.9 Bar and the initial pressure in the sample cavity is 2.5 GPa.

In step 2, a plurality of groups of relationship curves between a pressure of an external large volume press and the electrical resistance value of the standard 4 are obtained first in a pressure loading method with a static high pressure. An actual pressure in the sample cavity is obtained through a method/formula of (a final voltage—1.2V)*4.8/1600 according to an oil pressure value corresponding to a sudden change of the electrical resistance value of the standard 4, so as to obtain a curve which is obtained by fitting and that shows the relationship between the pressure of an external pressure loading mechanism and the pressure in the sample cavity. The large volume press may be a large volume press with a bladder-type energy storage device, or a large volume press with other structures capable of pre-charging a pressure. A pressure loading medium may be pressurized oil, pressurized gas, or the like. As a preferred embodiment of the present disclosure, the pressure loading medium is the pressurized oil. As a preferred embodiment of the present disclosure, after a pressure is pre-charged, the oil pressure reaches 105 Bar and the pressure of the pressure loading device reaches 14.9 GPa.

In step 3, a pressure release speed of the pressure loading device is controlled by a control device. In a case that a pressure in the sample cavity is detected by means of a pressure sensor to directly monitor whether a pressure loading time is reached, when the pressure in the sample cavity approaches (A+10) GPa, the pressure loading time is directly recorded. In a case that a voltage is detected to monitor whether the pressure loading time is reached, a voltage change jump value (the final voltage-1.2 V) can also be recorded in addition to recording the pressure loading time, where 1.2 V is an initial voltage. A pressure jump value can be obtained by using a formula through a change of a voltage value, so an actual pressure jump value, that is, (the final voltage-1.2V)*4.8/1600, in the sample cavity can be obtained according to a corresponding relationship between a voltage and a pressure of the pressure sensor. As a preferred embodiment of the present disclosure, an oscilloscope is used as a testing instrument, and a voltage of a signal is set as a triggering condition of the oscilloscope. Specifically, when the voltage at a time when the pressure in the sample cavity reaches (A+10) GPa satisfies the triggering condition of the oscilloscope, the time when a driving pressure changes is recorded by using single triggering, and the time when the pressure of the oscilloscope is generated is observed. According to a signal processing method, a rise time is the time when a response curve reaches a steady-state value for the first time from zero, and the pressure generation time of 18.59 ms may be obtained by adjusting the rise time by using the oscilloscope. By the change of the voltage of the oscilloscope, it is calculated that the pressure in the sample cavity reaches 12.4 GPa.

It is to be noted that, for those skilled in the art, it is apparent that the present disclosure is not limited to the details of the above exemplary embodiments and can be implemented in other specific forms without departing from the spirit or basic features of the present disclosure. Therefore, from any point of view, the embodiments are to be regarded as exemplary but not restrictive. The scope of the present disclosure is limited by the attached claims rather than the above description. Therefore, it is intended to include all changes within the meaning and scope of the equivalent elements of the claims in the present disclosure, and any numeral in the claims shall not be regarded as limiting the claims involved.

What is claimed is:

1. A pressure loading mold, comprising secondary anvils and a pressure transmission component, wherein a first structure formed by stacking the secondary anvils is internally provided with a first placement cavity; a first shape of the first placement cavity fits a second shape of the pressure transmission component; and the pressure transmission component is placed in the first placement cavity, wherein the secondary anvils are externally provided with primary anvils; a second structure formed by stacking the primary anvils is internally provided with a second placement cavity; a third shape of the second placement cavity fits a fourth shape of the first structure formed by stacking all the secondary anvils; and the secondary anvils are placed in the second placement cavity, wherein the primary anvils are externally provided with a housing; the housing is internally formed with a third placement cavity; a fifth shape of the third placement cavity fits a sixth shape of the second structure formed by stacking all the primary anvils; the primary anvils are placed in the third placement cavity; and end covers for closing the third placement cavity are respectively arranged at two ends of the housing, the pressure transmission component comprises a regular octahedra, plugs, diamond pistons, and a standard, wherein the regular octahedra is provided with a chamber with openings at two ends of the chamber; the standard is placed in the chamber; the openings at the two ends of the chamber are respectively blocked by the plugs with an electrically conductive function; and each of the diamond pistons is arranged between the standard and a corresponding one of the plugs.

2. The pressure loading mold according to claim 1, wherein the standard is externally sleeved with a first protective sleeve; and the first protective sleeve is able to cover the standard in a height direction over an overall height of the standard.

3. The pressure loading mold according to claim 2, wherein the plugs are externally sleeved with second protective sleeves respectively; and each of the second protective sleeves is able to cover a corresponding one of the plugs in a height direction over an overall height of the corresponding one of the plugs.

4. The pressure loading mold according to claim 3, wherein the first protective sleeve, the second protective sleeves, and the regular octahedra are all made of materials with a compressive strength not greater than 600 MPa.

5. The pressure loading mold according to claim 1, wherein the plugs are made of molybdenum.

6. The pressure loading mold according to claim 2, wherein the plugs are made of molybdenum.

7. The pressure loading mold according to claim 3, wherein the plugs are made of molybdenum.

8. The pressure loading mold according to claim 4, wherein the plugs are made of molybdenum.

9. A pressure loading method, implemented by using a pressure loading mold, and comprising:

step 1: providing the pressure loading mold, wherein the pressure loading mold comprises secondary anvils and a pressure transmission component, wherein a first structure formed by stacking the secondary anvils is internally provided with a first placement cavity; a first shape of the first placement cavity fits a second shape of the pressure transmission component; and the pressure transmission component is placed in the first placement cavity, wherein the secondary anvils are externally provided with primary anvils: a second structure formed by stacking the primary anvils is internally provided with a second placement cavity; a third shape of the second placement cavity fits a fourth shape of the first structure formed by stacking all the secondary anvils; and the secondary anvils are placed in the second placement cavity, wherein the primary anvils are externally provided with a housing: the housing is internally formed with a third placement cavity; a fifth shape of the third placement cavity fits a sixth shape of the second structure formed by stacking all the primary anvils: the primary anvils are placed in the third placement cavity; and end covers for closing the third placement cavity are respectively arranged at two ends of the housing, wherein the pressure transmission component comprises a regular octahedra, plugs, diamond pistons, and a standard, wherein the regular octahedra is provided with a chamber with openings at two ends of the chamber: the standard is placed in the chamber: the openings at the two ends of the chamber are respectively blocked by the plugs with an electrically conductive function; and each of the diamond pistons is arranged between the standard and a corresponding one of the plugs;

step 2: applying a pre-pressure to the pressure loading mold to compress various components of the pressure loading mold, and recording a current initial pressure value A GPa in a sample cavity;

step 3: obtaining a correspondence relationship between an oil pressure and a pressure in the sample cavity in a manner of calibrating a phase transition of a standard by means of an indirect pressure loading method with a static high pressure, obtaining a pressure correction curve by fitting according to a phase transition point of the standard, and pre-charging a pressure in a pressure loading device according to the pressure correction curve, so that the pressure in the pressure loading device is not lower than an external oil pressure corresponding to a pressure in the sample cavity of (A+10) GPa; and step 4: controlling the pressure loading device to release a pressure to the pressure loading mold, wherein a pressure release time is (20+/−3) ms, and a pressure in the sample cavity reaches (A+10) GPa.

* * * * *